PHONOGRAPH RECORD STORAGE MEANS

Original Filed May 23, 1950

INVENTOR.
RICHARD REEMSNYDER EBY
BY
Allan R. Redrow 3,007,702

PHONOGRAPH RECORD STORAGE MEANS

Richard R. Eby, 318 S. Oak St., Ephrata, Pa.

Continuation of application Ser. No. 163,671, May 23, 1950. This application June 4, 1957, Ser. No. 663,533
7 Claims. (Cl. 274—1)

This invention relates to a phonograph record storage means, and more particularly is concerned with a storage can for records adapted to be placed on a phonograph spindle having a relatively large diameter.

In its simplest form, the invention provides a metal can having interfitted base and cap members that may enclose a group of records. One of the members is provided with an integral hub element, generally centrally disposed, to receive the records and hold them against shifting in the can; and this hub may be used as a part of the means provided for locking the base and cap members together. When this is done as herein described, the flat disk records are held against buckling or warping, and therefore, the records are preserved in a condition such that more efficient operation of the phonograph is ensured.

In another aspect of the invention, the container may be used for the storage of a preselected sequence of records, and then to accomplish the playing thereof, the hub may be used as a centering means to place the entire sequence of records on the phonograph spindle. This may be accomplished in several ways, and thus, the invention provides an improved storage means that is also useful in setting the phonograph up for playing the records.

Other objects of the invention will appear more fully in the specification below.

This application is a continuation of my application Serial No. 163,671, filed May 23, 1950, now abandoned.

The preferred form of the invention is shown in the drawings wherein.

The container structure of the invention here shown is adapted particularly for holding records having a relatively large hole in the center for placement over the phonograph spindle, and currently such records are being made for the RCA 45 r.p.m. record player. The container is made up of a pair of interfitted top and bottom members which are adapted to contain the records therebetween, and in the preferred form of the invention, the top and bottom members can be drawn together whereby to produce a degree of pressure against the stack of records within the container which is sufficient to prevent warping or buckling of the records due to temperature changes or from other causes ordinarily encountered during storage. The application of a slight amount of pressure further holds all of the center portions of the records firmly together so that none of the sound track portions of the records may come in contact with each other thus eliminating any scratching of this relatively soft record material.

Figure 3:
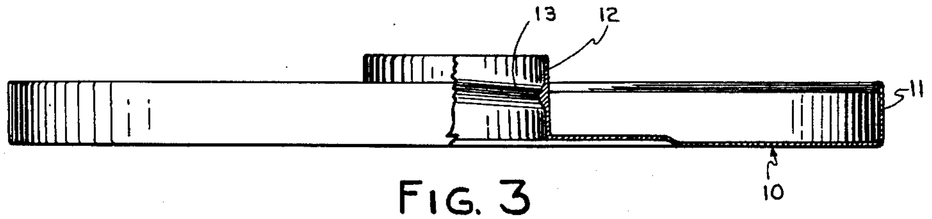
FIGURE 3 is a side elevation of the bottom member, partly broken away.

Referring to FIGURE 3, the bottom element 10 of the container is shown and it is provided with a side wall 11 and an upwardly extending center hub portion 12. The floor of the bottom section adjacent the hub may be raised somewhat for engaging the bottom-most one of a series of records placed in the container so as to hold the disk portion of this record well above the floor of the container.

The hub is preferably formed to have a cylindrical shape with an inside diameter of a size to easily fit within the hole in the records to be stored in the container. The hub preferably has a length to conveniently store a certain number of records in the container, but as will appear more fully below, the size of the hub and its cooperating members can be made adjustable for accommodating different numbers of records within the same container.

Preferably the hub 12 is provided with a screw thread 13 on its inner surface which cooperates with a corresponding screw threaded member on the top to hold the top and bottom of the container in assembled relation. The cooperating threaded means are preferably used to create the desired pressure on the stack of stored records which prevents buckling or warping of the records.

It will be noted particularly by reference to FIGURE 3 that the hub 12 is open lengthwise, and due to the relatively large diameter of the hub, it is quite easy to see through this hole which extends through the bottom portion of the container. This open ended hub structure is provided for the purpose of assisting in the loading of the phonograph, and when a number of records are stored in the container around the hub 12, it is only necessary to remove the top and hold the edges of the records, invert the bottom section, and then quickly line up the spindle of the phonograph through the hole, bring the hub down on the top of the spindle and release the records onto it. In this way, a very convenient, quick, and efficient device is provided for loading the records onto the phonograph in position to be played automatically.

To assist in this loading operation, the side wall 11 of the bottom section is held to a rather short length so that the edges of the records stored in the container may be easily engaged by the fingers without reaching over or touching the sound track portion of the records. It will also be noted that the side wall has a rolled upper edge and this has been found preferably to stiffen the wall whereby to prevent distortion.

The top element 15 is provided with a side wall 16 that telescopes over the side wall 11 and similarly, the wall 16 is provided with a rolled lower edge to insure proper mating of the walls so that they may be slipped together and apart without binding. The assembled top and bottom elements thus provide a storage container that is practically dust tight whereby the records are maintained in their finest condition for use.

The top member is provided with a center hub 17 which, in the preferred form of the invention is designed to fit inside the hub 12 of the bottom member, and the hub 17 as above suggested is provided with a screw thread 14 for cooperating with thread 13 on the inside of the bottom hub to hold the top and bottom elements assembled.

Preferably the hub porton 17 of the top is rotatably mounted with respect to the top 15 and this may be done by providing the hub with a horizontal extending flange 18 which may be engaged between the underside of the top 15 and an angular clip-like member 19 which may be welded or otherwise fixed integral with the underside of top 15. The center part clip 19 is spaced a bit from top 15 where it embraces the flange 18 to form a space for receiving the flange so that it will be free to turn with respect to the top 15. It will be noted that the clip 19 provides a raised portion adjacent the hub 17 which assists in the clamping of the center portions of the records together.

Figure 1:
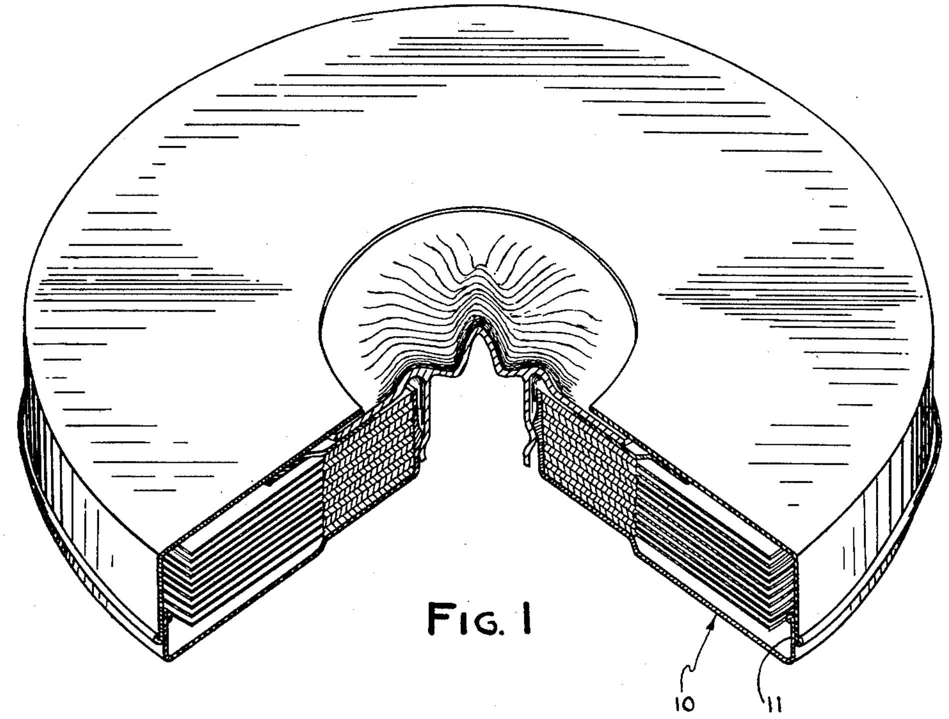
FIGURE 1 is a top perspective view of the assembled parts of the container, partly broken away to show a series of records stored therein.
Figure 2:
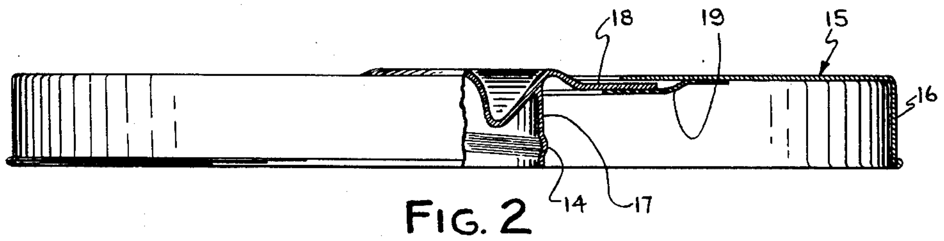
FIGURE 2 is a side elevation of the top member, partly broken away.

To use the invention here disclosed a selection of records is made and the records are dropped over the hub 12 of the bottom element 10. The hub 17 on the top member 15 is then lined up with hub 12 and the two members are drawn together through the cooperation of the threads 13 and 14 on the respective hub members. When the hubs of the top and bottom are lined up and drawn together, the walls 11 and 16 telescope easily and the container is quickly closed by a partial rotation of hub 17. The hubs are drawn together by the interaction of the threads, with sufficient force such that the raised portion of the bottom member 10 and the raised portion of clip 19 firmly engage the top and bottom of the pile of records stored in the container to hold them clamped together with a sufficient pressure to prevent their warping or buckling. The sound track portions of the records project outwardly, as is clearly shown in FIGURE 1, and are properly held so that they cannot be scratched or otherwise damaged by contact with the container or each other during storage.

It will be noted that records can be stored in a particular sequence on the hub 12 and the records can be always played in this desired order and as above explained, when the records are to be played, the top 15 is removed and the records are dropped from the hub 12 of the bottom 10 onto the spindle of the record player after the spindle has been lined up with the hub by sighting through the hole provided lengthwise through the hub 12. When this procedure is followed, and a particular sequence of records has been stored in the container, the records are played in the desired order without any further manipulation.

After the records have all been played, and it is desired to remove the records from the record player, they may be lifted off and maintained in their sequence by reversing the procedure just described for loading the player. The hub portion in the bottom member may be lined up with the spindle and the records withdrawn from the spindle. If it is desired to play the other side of the records in sequence, the records may be turned over without manually handling each record by withdrawing the records from the spindle onto the hub element 17 of the top member 15 and then dropping the records onto the hub 12 of the bottom member 10. The records may then be returned to the spindle with the other side of the records lined up in a given sequence. It will be noted that all of the records are taken off or dropped onto the spindle together so that there need never be a change in the sequence unless it is desired, whereupon the records may be manually removed and sorted.

While the preferred form of the invention is shown in the drawings, many modifications thereof may occur to those skilled in the art, for example, the center hub 12 may be made solid and provided with a thread means on the outside of the surface for cooperating with a female hub element fixed to the top member which would engage around these threads. In this instance, the bottom hub may be made of a clear plastic through which the spindle of the phonograph may be sighted for lining the hub up with the spindle, or a pair of cooperating centering elements may be provided on the spindle and the top portion of the hub 12 which will automatically line up the hub and spindle as they are brought together. It will be also noted that the top hub member might be made integral with the top member so that the entire top would have to be turned to draw the hub portions together to produce the desired pressure against the records.

It is also suggested that means could be provided for drawing the top element more or less down on the bottom whereby different numbers of records could be stored in the container while producing the desired pressure to prevent warping or buckling of the stored records. It is obvious, of course, that this invention can be incorporated in a container of a shape other than circular, and it is suggested that a square or oblong outside wall pattern may have certain advantages for storing records in the conventional manner of using albums of records. These and many other similar modifications as above suggested may occur to those skilled in the art which will fall within the scope of the following claims.

I claim:

1. A record container and phonograph loading device for cooperation with a stack of phonograph records, said stack of records having a spindle receiving aperture sufficiently large to permit easy sighting of the spindle of a record player therethrough by both eyes of the user thereof when the record stack is held at about arm's length, comprising a container body having a space to receive said stack of records to be stored therein, said body having a floor portion for said space and the floor having an aperture therein of a size to permit easy sighting of said spindle by both the eyes of the user thereof, a thin-walled hub member disposed in said space vertically with respect to said floor, said hub being disposed so as to surround the aperture in the floor, said hub being adapted to receive said stack of records and having an external shape to closely engage the aperture in the stack of records whereby to hold the records in said stack in substantial alignment, said hub having both ends open and being hollow from end to end and cooperating with said aperture in the floor portion to provide a sight hole for lining the stack of records up with the spindle of a record player so that the container body may be upended and aligned with the spindle by sighting through the hollow hub to permit the records to slide off of the hub and onto the spindle to load the player and by reversing the loading process to be slid off of the spindle and back onto the hub to unload the spindle of the record player.

2. A container for records; said container having top and bottom portions, one of said portions having an aperture of a relatively large size to permit the sighting of a spindle of a record player therethrough by both the eyes of the user thereof when held substantially at arm's length; mating generally centrally located stud members fixed respectively to said top and bottom portions; at least one of said stud members having both ends open and being hollow from end to end; one of said stud members detachably interfitting with the other stud member; and means cooperating with said interfitted stud members to lock the top and bottom portions together; said open-ended stud member having an outer diameter to closely fit a stack of records having a correspondingly large aperture, which records may be disposed in said container to surround said open-ended stud member; the respective container portion to which said open-ended stud is fixed having said relatively large diameter aperture therein, said aperture being of about the same size as and in alignment with the open-ended stud member to form said relatively large size sighting aperture in said portion of the container; whereby when the stack of records is to be placed on a record player having a relatively large diameter spindle, said open-ended stud may be separated from the other stud to open the container and said open-ended stud may then be inverted and lined up with the spindle of the record player by sighting therethrough to permit the stack of records to be dropped as a unit from the stud onto the spindle of the record player and the spindle loading process being reversible to return the stack of records to said other stud member, and said other stud member being adapted to temporarily receive said stack of records after the stack has been placed on the spindle so that the stack can then be removed from said other stud to be disposed on said open-ended stud to position said stack in said apertured portion of the container with the records turned over so that the other sides thereof may be played when the stack of records is again placed on the spindle.

3. A record container and phonograph loading device for cooperation with a stack of phonograph records, said stack of records having a spindle receiving aperture sufficiently large to permit easy sighting of the spindle of a record player therethrough by both eyes of the user thereof when the record stack is held at about arm's length, comprising a container body having a space to receive said stack of records to be stored therein, said body having a floor portion for said space and the floor having an aperture therein of a size to permit easy sighting of said spindle by both the eyes of the user thereof, a thin-walled hub member disposed in said space with respect to said floor, said hub being disposed so as to surround the aperture in the floor, said hub being adapted to receive said stack of records and having an external shape to closely engage the aperture in the stack of records whereby to hold the records in said stack in substantial alignment, said hub having both ends open and being hollow from end to end and cooperating with said aperture in the floor portion to provide a sight hole for lining the stack of records up with the spindle of a record player so that the container body may be upended and aligned with the spindle by sighting through the hollow hub to permit the records to slide off of the hub and onto the spindle to load the player and by reversing the loading process to be slid off of the spindle and back onto the hub to unload the spindle of the record player, a cover for said container of a size and shape to close said space, said cover having a protruding element adapted to be interfitted within the thin-walled hub member, and releasable means cooperating between the thin-walled hub member and the protruding element for holding the cover assembled on the container during storage of the records therein.

4. A record container and phonograph loading device for cooperating with a stack of phonograph records, said stack of records having a spindle receiving aperture sufficiently large to permit easy sighting of the spindle of a record player therethrough by both eyes of the user thereof when the record stack is held at about arm's length, comprising a container body having a space to receive said stack of records to be stored therein, said body having a floor portion for said space and the floor having a sight window therein of a size to permit easy sighting of said spindle by both eyes of the user thereof, a hub in the form of a sight tube member having an outer wall disposed in said space and vertical with respect to said floor, said hub being disposed so that its outer wall surrounds the sight window, said hub being adapted to receive said stack of records and the outer wall thereof having an external shape to closely engage the aperture in the stack of records whereby to hold the records in said stack in substantial alignment, said sight tube cooperating with said sight window in the floor portion to provide means for lining the stack of records up with the spindle of a record player so that the container body may be upended and visually aligned with the spindle to permit the records to slide off the hub and onto the spindle to load the record player.

5. A record container and phonograph loading device for cooperating with a stack of phonograph records, said stack of records having a spindle receiving aperture sufficiently large to permit easy sighting of the spindle of a record player therethrough by both eyes of the user thereof when the record stack is held at about arm's length, comprising a container body having a space to receive said stack of records to be stored therein, said body having a floor portion for said space and the floor having a sight window therein of a size to permit easy sighting of said spindle by both the eyes of the user thereof, a hub in the form of a sight tube member having an outer wall disposed in said space and vertical with respect to said floor, said hub being disposed so that its outer wall surrounds the sight window, said hub being adapted to receive said stack of records and the outer wall thereof having an external shape to engage the aperture in the stack of records whereby to hold the records in said stack in substantial alignment, a cover for enclosing said space, protruding means on the cover adapted to be positioned in said space for cooperating with said sight tube and releasable means for engaging the protruding means and sight tube together whereby to hold the cover assembled on the container, and upon the removal of said cover said sight tube cooperating with said sight window in the floor portion to provide means for lining the stack of records up with the spindle of a record player so that the container body may be upended and visually aligned with the spindle to permit the records to slide off the hub and onto the spindle to load the record player.

6. A record container and phonograph loading device for cooperating with a stack of delicate phonograph records, said stack of records having a relatively large diameter spindle receiving aperture therein; comprising a container body having a space to receive a stack of records to be stored therein; a vertical side wall for said space and a floor portion for said space; a hub member integral with the floor; said hub having an outer peripheral wall disposed in said space and vertical with respect to said floor; said hub extending vertically beyond the confines of said side wall; said hub being adapted to receive said stack of records over its outer wall; said outer wall of the hub having an external shape to closely engage the apertures in the records forming said stack whereby to hold the records in said stack in substantial alignment; said floor portion, vertical side wall of the space, and hub cooperating with said records to provide means adapted for manually lining the stack of records up with the spindle of a record player while the records are held on the hub of the container by the fingertips engaging only the edge portions of the records disposed on said hub which are not confined within said side wall so that the container body may be upended and the hub aligned with the spindle to permit the records to slide off the hub and onto the spindle to load the player and by reversing the loading process to be slid off of the spindle and back onto the hub to unload the spindle of the record player in a manner requiring the fingering of the edge portion only of the delicate records forming said stack.

7. A record container and phonograph loading device for cooperating with a stack of delicate phonograph records, said stack of records having a relatively large diameter spindle receiving aperture therein; comprising a container body having a space to receive a stack of records to be stored therein; a vertical side wall for said space and a floor portion for said space; a hub member integral with the floor; said hub having an outer peripheral wall disposed in said space and vertical with respect to said floor; said hub extending vertically beyond the confines of said side wall; said hub being adapted to receive said stack of records over its outer wall; said outer wall of the hub having an external shape to closely engage the apertures in the records forming said stack whereby to hold the records in said stack in substantial alignment; a cover for said container for coacting with the floor and side wall of said space for completing the enclosure of said stack of records within said space; said cover having protruding means for interfitting with said hub; releasable means cooperating between said hub and protruding means for removably holding said cover assembled on said hub; said floor portion of the container, vertical side wall of the space, and hub cooperating with said records to provide means adapted for manually lining the stack of records up with the spindle of a record player while the records are held on the hub of the container by the fingertips engaging only the edge portions of the records disposed on said hub which are not confined within said side wall so that the container body may be upended and the hub aligned with the spindle to permit the records to slide off the hub and onto the spindle to load the player and by reversing the loading process to be slid off of the spindle and back onto the hub to unload the spindle of the record player in a manner requiring the fingering of the edge portion only of the delicate records forming said stack.

References Cited in the file of this patent

UNITED STATES PATENTS 1,320,958 Albrecht et al. ---------- Nov. 4, 1919

(Other references on following page)

UNITED STATES PATENTS

| | | |
|---|---|---|
| 1,926,606 | Ward | Sept. 12, 1933 |
| 1,940,088 | Harrison | Dec. 19, 1933 |
| 1,965,744 | Lannerd | July 10, 1934 |
| 2,555,594 | Markovitz | June 5, 1951 |
| 2,643,127 | Gregg et al. | June 23, 1953 |
| 2,678,861 | Funk | May 18, 1954 |
| 2,766,068 | Roissard | Oct. 9, 1956 |
| 2,777,699 | Woodruff | Jan. 15, 1957 |

FOREIGN PATENTS

| | | |
|---|---|---|
| 482,667 | Great Britain | Apr. 4, 1938 |